United States Patent
Jiang

(10) Patent No.: US 7,822,080 B2
(45) Date of Patent: Oct. 26, 2010

(54) HIGH POWER PULSED FIBER LASER

(75) Inventor: Min Jiang, Acton, MA (US)

(73) Assignee: Coherent, Inc., Santa Clara, CA (US)

( * ) Notice: Subject to any disclaimer, the term of this patent is extended or adjusted under 35 U.S.C. 154(b) by 134 days.

(21) Appl. No.: 12/341,304

(22) Filed: Dec. 22, 2008

(65) Prior Publication Data

US 2009/0190615 A1 Jul. 30, 2009

Related U.S. Application Data

(60) Provisional application No. 61/015,710, filed on Dec. 21, 2007.

(51) Int. Cl.
H01S 3/30 (2006.01)
(52) U.S. Cl. .............................. 372/6; 385/31
(58) Field of Classification Search .................. 385/31; 372/22, 6, 39; 359/333
See application file for complete search history.

(56) References Cited

U.S. PATENT DOCUMENTS

| | | | | |
|---|---|---|---|---|
| 5,291,507 | A * | 3/1994 | Haase et al. ............. 372/44.01 |
| 6,603,598 | B1 * | 8/2003 | Oliveti et al. ............. 359/341.5 |
| 7,082,243 | B2 * | 7/2006 | Bickham et al. ............. 385/127 |
| 7,375,877 | B1 * | 5/2008 | Di Teodoro et al. .... 359/341.41 |
| 7,430,352 | B2 * | 9/2008 | Di Teodoro et al. ......... 385/123 |
| 7,440,175 | B2 * | 10/2008 | Di Teodoro et al. ...... 359/341.1 |
| 7,492,993 | B2 * | 2/2009 | Nakai et al. .................... 385/46 |
| 7,634,164 | B2 * | 12/2009 | Farroni et al. ............... 385/127 |
| 7,738,166 | B2 * | 6/2010 | Murison et al. .......... 359/341.3 |
| 2005/0105854 | A1 * | 5/2005 | Dong et al. .................... 385/46 |
| 2005/0231797 | A1 | 10/2005 | Boretz et al. |
| 2006/0039423 | A1 | 2/2006 | Tokuhisa et al. |
| 2007/0230884 | A1 | 10/2007 | Minelly et al. |

FOREIGN PATENT DOCUMENTS

WO WO-2007/061732 5/2007

OTHER PUBLICATIONS

Jiang et al., "Stable 10 ns, kilowatt peak-power pulse generation from a gain-switched Tm-doped fiber laser", *Optics Letters*, vol. 32, No. 13, pp. 1797-1799 (2007).

* cited by examiner

*Primary Examiner*—Minsun Harvey
*Assistant Examiner*—Tuan N. Nguyen
(74) *Attorney, Agent, or Firm*—Morrison & Foerster LLP

(57) ABSTRACT

A high power fiber laser includes a pump source optically coupled to a first fiber laser, which is in turn optically coupled to a second fiber laser. The pump source is adapted to generate light, which is received by the first fiber laser and used to generate a first pulsed output. The first pulsed output is directed into the second fiber laser and is used to generate a second pulsed output. The first fiber laser includes a multimode fiber, while the second fiber laser includes a single mode fiber.

2 Claims, 2 Drawing Sheets

HIGH POWER PULSED FIBER LASER

PRIORITY

Priority is claimed under 35 U.S.C. §120 to U.S. Provisional Patent Application Ser. No. 61/015,710, filed Dec. 21, 2007. The disclosure of the aforementioned priority document is incorporated herein by reference in its entirety.

BACKGROUND OF THE INVENTION

1. Field of the Invention

The field of the present invention is pulsed fiber lasers, particularly pulsed laser generation in the mid-infrared range.

2. Background

Fiber lasers have several advantages, among them being high efficiency, good thermal management, and inherent robustness. Fiber lasers have been demonstrated to achieve power conversion efficiency of over 90%, and power levels of near 1 kW in continuous wave (CW) operation. For pulsed operation, however, the output pulse parameters are usually limited by the material and geometrical properties of the gain fiber. In particular, pulse energy is typically proportional to and limited by the total number of rare-earth dopant ions in the fiber core.

Different designs of pulsed fiber lasers present various advantages for different applications, with the primary advantage being the ability to control properties of the output pulse for a particular application. For example, the different rare-earth elements, such as erbium, neodymium, ytterbium, and thulium, which are often used as core dopants in fiber lasers, each provide their own advantages. Both multi-mode fibers and single-mode also present their own advantages, as do single and double clad fibers. The core size of the fiber is another parameter that may be controlled to achieve desired advantages. Examples of pulse output properties that can be controlled by selection of fiber characteristics include output wavelength band, pulse duration, pulse rate, and pulse energy, among others.

The high gain achievable with fiber lasers is advantageously used in a process of operating fiber lasers called Q-switching. The output pulse energy available in a Q-switched fiber laser can be given approximately by:

$$E \propto V h \nu (N_{2i} - N_{2f}), \quad (1)$$

where $N_{2i}$ and $N_{2f}$ are the initial (pre-pulse, pre-switch) and final (post-pulse, post-switch) inverted ion concentrations within the fiber core per unit volume, and V is the volume of the core of the fiber. In other words, the pulse energy is proportional to the total number of ions that release energy during emission of the pulse. The higher the value of $N_{2i}$, the more pulse energy can be extracted from the fiber. The highest possible value for both $N_{2i}$ and $N_{2f}$ is N, the total erbium ion concentration within the fiber core per unit volume. The value of $N_{2f}$ is given, in many practical cases, approximately by $N\sigma_a/(\sigma_a+\sigma_e)$, where $\sigma_a$ and $\sigma_e$ are the absorption and emission cross-sections. The value of $N_{2i}$ obtained during the build-up phase in a Q-switched fiber laser is a strong function of decay time, so selecting a medium with a long decay time allows for the storage of more energy in the fiber core. Thus, an Er-doped fiber, in which the ions have a decay time of about 10 ms, is able to store more energy than a Tm-doped fiber, in which the ions have a decay time of about 0.5 ms, all other things being equal. For this reason, a Tm-doped fiber requires a significantly higher pump power to invert the medium during the build-up stage of Q-switching than does an Er-doped fiber of comparable absorption.

For a given level of dopant concentration N, the total number of active ions in a fiber is limited by the total volume of the doped core, with the result that the volume of the fiber core has a direct relationship with the total pulse energy in a Q-switched fiber laser. For example, by using a piece of commonly available single-mode Er-doped fiber, having a core radius of 1.5 μm, a length of 5 meters, and an industry standard erbium ion concentration of $0.5 \times 10^{25}$ ions per cubic meter, in a Q-switched fiber laser, the upper limit on the output pulse energy would be on the order of only 10 μJ. In order to increase the pulse energy output, the total number of erbium ions must be increased. This can be done by increasing the length and/or the core size of the fiber to increase the overall volume of the core. For a core volume increase in the neighborhood of two orders of magnitude, the radius of the core can be increased from 1.5 microns to about 15 μm, which, if no changes are made to the core composition, renders the fiber multi-moded. Alternately, the length of the fiber can be increased from 5 meters to about 0.5 km. However, a very long fiber, due simply to the length, is impractical for most applications.

While pulsed lasers appear to offer numerous advantages for industrial, medical, and military applications, most pulsed fiber lasers remain an R&D tool, as they can not provide a performance to cost ratio which meets commercial needs. One prominent example is the pulsed Tm-doped fiber laser (TDFL). With emission spectrum from 1.8 μm to 2.1 μm, a range which contains a strong $H_2O$ absorption band, the TDFL has potential for use as a minimally invasive surgical tool. To qualify for such applications, the TDFL should generate pulse energies on the order of 10 mJ to 100 mJ, together with multi-kW peak power.

SUMMARY OF THE INVENTION

The present invention is directed toward a high power fiber laser. A pump source generates light and is optically coupled to a first fiber laser. The first fiber laser includes a multi-mode fiber and is adapted to generate a pulsed output using the light produced by the pump source. A second fiber laser is optically coupled to the first fiber laser to receive the pulsed output from the latter, which induces the second fiber laser to generate its own pulsed output.

Several optional features may be incorporated into the high power fiber laser. As one option, the second fiber laser includes a single mode double-clad fiber with inner cladding having a radius which is substantially equal to the radius of the core of the multi-mode fiber in the first fiber laser. As another option, the fiber laser may be operated such that a single first pulsed output induces the second fiber laser to generate at least one second pulsed output. As another option, the first fiber laser may be adapted to operate in a Q-switched mode to generate the first pulsed output. As yet another option, an emission band of the first fiber laser overlaps an absorption band of the fiber in the second fiber laser. As yet another option, an emission band of the first fiber overlaps with an absorption band of the second fiber core. As yet another option, the first fiber core and the inner cladding of the second fiber may be mode-matched. As yet another option, the first fiber core may be optically coupled to at least one of the fiber core and the inner cladding of the second fiber. As yet another option, the first fiber core may be an erbium-doped fiber core. As yet another option, the second fiber core may be a thulium-doped fiber core. As yet another option, the pump source may be adapted to generate light in a continuous wave mode. Any of the aforementioned options may be implemented singly or in any desired combination.

Accordingly, an improved high power fiber laser is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1A:
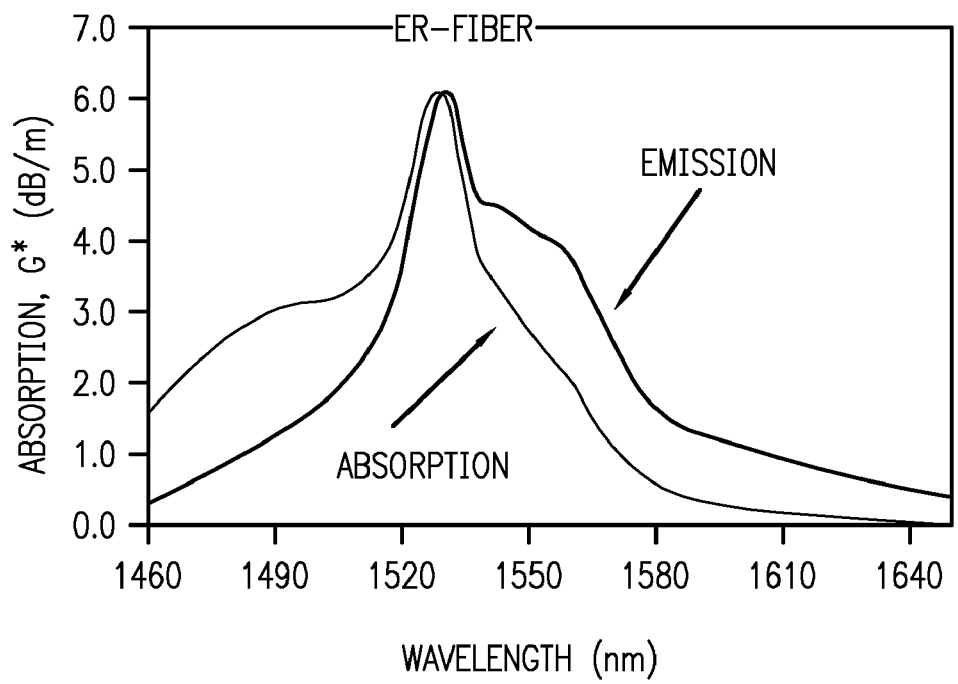
FIG. 1A illustrates the absorption and emission spectra of an Er-doped fiber.
Figure 1B:
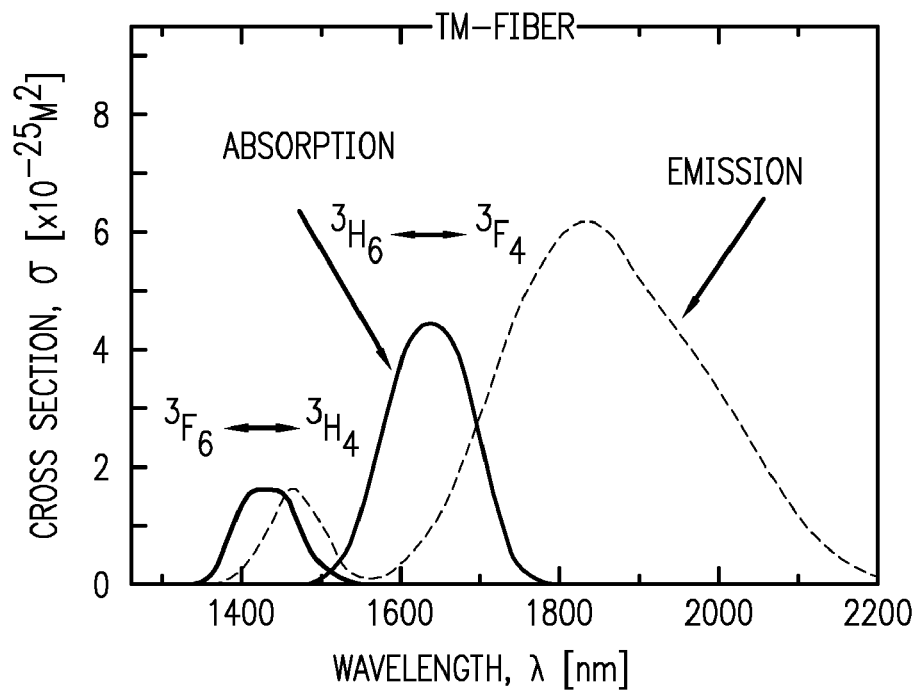
FIG. 1B illustrates the absorption and emission spectra of a Tm-doped fiber.

Turning in detail to the drawings, FIGS. 1A & 1B illustrate the emission and absorption spectra of an Er-doped fiber and a Tm-doped fiber, respectively. The emission spectrum of the Er-doped fiber overlaps the absorption spectrum of the Tm-doped fiber sufficiently so that the pulsed output from a primary fiber laser, which utilizes an Er-doped fiber, may be used to pump a secondary fiber laser, which utilizes a Tm-doped fiber. These two types of fibers are shown for the primary and secondary fiber lasers, as described more in detail below, to exemplify the concepts of the high power fiber laser presented herein. In practice, any appropriate type of fiber laser may be chosen for the primary and secondary fiber lasers, with the understanding that the high power fiber laser will operate more efficiently with greater overlap between the emission spectrum of the primary fiber laser with the absorption spectrum of the secondary fiber laser. In addition, the choice of fiber for the secondary fiber laser will significantly impact the spectrum of the pulsed output therefrom. Thus, the type of fiber used in the secondary fiber laser will largely depend upon design considerations for the application with which the high power fiber laser is to be used.

Figure 2:
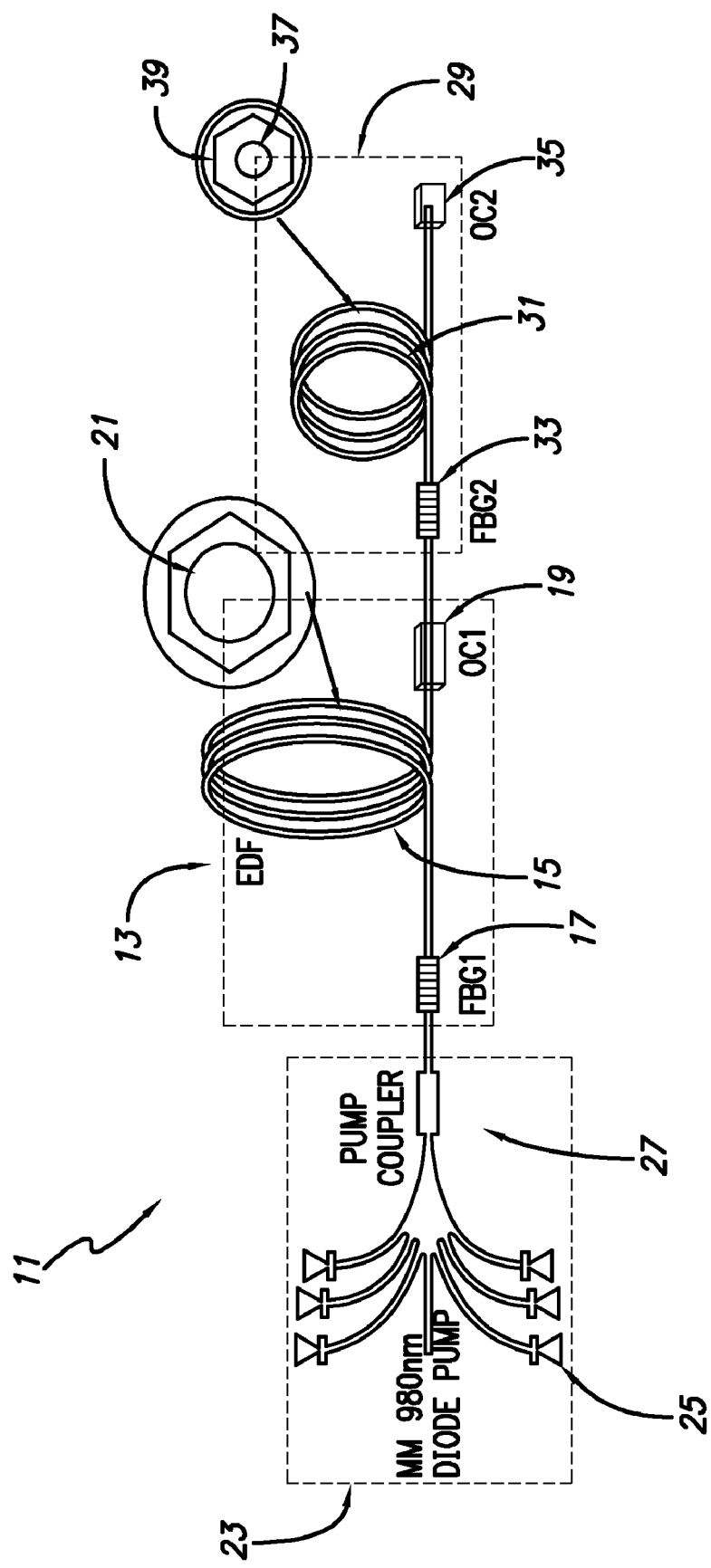
FIG. 2 schematically illustrates a high power fiber laser.

FIG. 2 illustrates the construction of a high power fiber laser 11. A primary fiber laser 13, in this case an Er-doped fiber laser (EDFL), includes a large core Er-doped fiber (EDF) 15 having a Bragg grating 17 at one end and a time-controlled output coupler 19 at the other end. The EDF laser cavity, may be linear, ring, sigma or any other configuration to meet design preferences for a particular application. Mechanical, electro-optical, acousto-optical or nonlinear optical devices may be used as the time-controlled output coupler 19, such as are commonly known to those of skill in the art. The EDF 15 has a large doped multi-mode core 21, preferably on the order of 10 μm to 200 μm in diameter, or more, depending upon the requirements of the particular application, and may be single- or multi-clad, according to design preference. A diode pump 23, which includes a plurality of light-emitting diodes 25, emits light including at least the diode pump wavelength, $\lambda_{Diode}$, includes a pump coupler 27, which optically couples the diode pump 23 into the EDF 15. Light passes from the diode pump 23, into and through the pump coupler 27, through the Bragg grating 17, and into the EDF 15. The diode pump 23 may be constructed in any manner according to design preference. For example, the pump diode may include any number of bundled individual diodes, from one to many, one or more multiple emitter diode bars, and the like. The pump coupler 27 may also be constructed in any manner according to design preference. For example, the pump coupler may be based on a fiber or dichroic reflector/transmitter, and it may be single mode or multi-mode, depending on the geometry of the gain fiber. For best efficiency, the pump coupler 27 should be compatible with the geometry of the fiber 15 in the primary fiber laser 13.

The Bragg grating 17 transmits the diode pump wavelength, but reflects the EDF emission wavelength, $\lambda_C$, thus serving as one of the cavity mirrors for the primary fiber laser 13. The time-controlled output coupler 19 serves as the other cavity mirror and has controllable reflectivity to the EDF emission wavelength, thereby enabling Q-switching of the EDF cavity to generate a pulsed output from the primary fiber laser 13. Such time-controlled output couplers are well known to those of skill in the art.

The primary fiber laser 13 is optically coupled to a secondary fiber laser 29, in this case a Tm-doped fiber laser (TDFL). The secondary fiber laser 29 includes a Tm-doped fiber (TDF) 31 having a Bragg grating 33 at one end and flat terminated at the second end at an optical coupler 35. The TDF 29 has a single-mode core 37 and is double clad, with the inner cladding 39 being essentially mode-matched to the EDF core 21 to aid in maximizing power efficiency. As with the EDF, the TDF laser cavity may be linear, ring, sigma, or any other configuration to meet design preferences for a particular application.

The TDF core 37 has a significantly smaller cross-sectional area as compared to the TDF inner cladding 39. The ratio between the cross-sectional area of the TDF core, $A_{core}$, and that of the TDF inner cladding, $A_{clad}$, is selected such that effective pump absorption, $\alpha_{Eff}$ is within the reasonable range of common practice, thus enabling the fibers of both the primary and secondary fiber lasers to have reasonably manageable lengths for most applications. This ratio may be determined according to the following well known expression:

$$\alpha_{Eff} = (A_{core}/A_{clad})\alpha_{core}. \qquad (2)$$

The pulsed output of the primary fiber laser 13 is optically coupled into the TDF 31, passing through the Bragg grating 33. As is described in connection with the operation aspect of the fiber laser below, the pulsed output of the primary fiber laser 13 at the EDF emission wavelength, $\lambda_C$, when injected into the TDF 31, is absorbed by the TDF 31 and induces the TDF 31 to emit a pulse at the TDF emission wavelength, $\lambda_{Out}$, with the pulse energy being related to the pulse energy of the output pulse from the primary fiber laser, taking into account the efficiencies in the optical coupling between the fiber lasers and the absorption of the EDF emission wavelength within the TDF.

During operation, the diode pump 23 is driven by an electric current source (not shown) to operate in a continuous wave (cw) or quasi-cw mode and produce light including at least the diode pump wavelength, $\lambda_{Diode}$. Light emitted by the diode pump 23 is injected into and absorbed by the EDF core 21, thereby creating a population of inverted ions in the EDF core 21. Using the time-controlled output coupler 19 in a manner well known to those of skill in the art, the population of inverted ions is allowed to increase in concentration over time, until the time-controlled output coupler 19 is switched to increase the Q of the cavity and induce emission of an output pulse at the EDF emission wavelength, $\lambda_C$. A single pulse or multiple pulses may be generated to deplete the accumulated inverted ion population. Following substantial depletion of the inverted ion population, the time-controlled output coupler 19 is switched to decrease the Q of the cavity, thereby allowing the population of inverted ions to once again build in the EDF core 21. This cycle can be repeated at a wide range of repetition rates.

The high peak-power pulsed output from the primary fiber is injected into the TDF inner cladding 39 and absorbed by the TDF core 37. This induces amplified spontaneous emission (ASE) in the TDF 31, resulting in pulses emitted from the TDF 31 that are switched on and off by the pulsed emissions of the primary fiber laser 13. As can be seen in FIGS. 1A & 1B, in the high power fiber laser 11 described above, the primary fiber laser 13 emits pulses at the EDF emission wavelength, $\lambda_C$, including wavelengths between about 1500 nm to 1600 nm, and the TDF core 35 in the secondary fiber laser 27 strongly absorbs light around 1600 nm. Further, since the core of a typical commercial TDF absorbs light at this wavelength on the order of hundreds of dB per meter, very efficient absorption of the output pulses from the primary fiber laser 13 can be achieved by clad-pumping the TDF 31. However, as an alternative configuration, the primary fiber laser may be configured to core pump the fiber in the secondary fiber laser.

The primary fiber laser may be switched, by a variety of means other those described above. The primary fiber laser may be switched with a repetition rate sufficiently high to enable gain-switching of the secondary fiber laser, as described in Min Jiang, and Parviz Tayebati, "Stable 10 ns, KW Peak-Power Pulse Generation from Gain-Switched Thulium-Doped Fiber Laser," Opt. Lett. V32, pp 1797-1799, (2007), the disclosure of which is incorporated herein by reference in its entirety.

The use of a primary fiber laser to pump a secondary fiber laser may also be applied in a cascaded mode containing multiple stages of upstream fiber lasers used for pumping multiple downstream fiber lasers. Such configurations can provide further control of brightness, wavelength, and pulse duration. For example, a double clad EDFL may be optically added between the EDFL 11 and the TDFL 29 in FIG. 2 to convert the pulsed output from the EDFL 11 into a low spatial mode output, which is then injected into the TDFL 29 by core-pumping the TDF 31. Such a configuration is anticipated to allow the cavity length of the TDF 31 to be significantly reduced, thereby enabling very short output pulses from the fiber laser 11.

Several advantages are achieved by constructing fiber lasers in the manner described above. One advantage is in the use of a large core fiber in the primary fiber laser. Although a small core fiber may be used, the large core fiber makes it easier to focus light from the pump diode into the fiber core. Optically, it is easier to direct light from the pump diode into a fiber core having a diameter of tens, or potentially hundreds, of microns, as opposed to a fiber core having a diameter of only 3 microns (as is the case with the most commonly available EDF). The use of large core fiber therefore permits higher coupling efficiency. The use of large core fiber also allows for a saving in cost and complexity for the coupling optics.

The energy storage capacity of the large core fiber, when used as part of the primary fiber laser, is also advantageous, especially when combined with the long lifetime of erbium. The large core increases the energy storage capacity by increasing the total core volume and the total number of erbium ions, while the long lifetime facilitates the attaining of high inversion population, which further contributes to high pulse energy.

Another advantage of a large core is that it allows for obtaining a given core volume and a given number of erbium ions by using a shorter length of fiber than would be required with a smaller core fiber. Beyond the practical benefit of a shorter fiber, the shorter fiber length offers the additional benefit of reducing the harmful effects of amplified spontaneous emission (ASE) during the build-up phase of Q-switching. For a given erbium concentration level, ASE is amplified along the length of the fiber by the essentially same number of decibels per unit length, regardless of the core diameter. Thus, the shorter fiber results in the development of less ASE radiation and results therefore in less depletion of the inversion population (via stimulated emission), compared to the case of a longer fiber.

The large core fiber has a further advantage in that the pump power density is significantly lower in the short large core fiber than in the longer smaller core fiber. This is important because it is anticipated that harmful, power-draining non-linear effects—such as pump excited state absorption (ESA)—will be reduced by the use of a larger core. It is further anticipated that the longer small core fiber will operate at a pump power density near the ESA threshold, while the shorter large core fiber will operate at a pump power density lower than the ESA threshold.

The properties of the fibers used in the primary and secondary fiber lasers may be changed to achieve more efficient pumping, such as by changing the absorption spectrum, or to alter the characteristics of the output pulse from the fiber laser, i.e., any one or combination of the pulse energy, emission spectrum, pulse width, pulse rate, and the like may be changed through careful selection of materials, doping agents, and geometrical properties of the fibers. To this end, various doping elements may be used in any desired concentration with any combination with host glass. In fact, the same doping element may be used in both the primary and secondary fiber lasers. The geometries of the fibers used in the primary and secondary fiber lasers may also be widely varied, depending upon design preferences.

Thus, a high power fiber laser is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A fiber laser comprising:
   a pump source adapted to generate light;
   a first fiber laser optically coupled to the pump source to receive light produced by the pump source and adapted to generate a first pulsed output of light, wherein the first fiber laser includes a multi-mode fiber having a first fiber core and wherein the first fiber core is an erbium doped fiber core and wherein the first fiber laser is adapted to operate in a Q-switched mode to generate the first pulsed output; and
   a second fiber laser optically coupled to the first fiber laser to receive the first pulsed output, the received first pulsed output inducing the second fiber laser to generate a second pulsed output of light, wherein the second fiber laser includes a single mode fiber having a second fiber core and an inner cladding wherein the diameters of the inner cladding and the first fiber core are selected so that the output from the first fiber core is coupled into the inner cladding and wherein the second fiber core is a Thulium-doped fiber core.

2. The fiber laser of claim 1, wherein the inner cladding and the first fiber core have substantially equal radii.

* * * * *